United States Patent
Yeske

[15] 3,666,019
[45] May 30, 1972

[54] ROW MARKING APPARATUS

[72] Inventor: Laurel R. Yeske, Rockford, Ill.
[73] Assignee: J. I. Case Company
[22] Filed: Oct. 7, 1969
[21] Appl. No.: 864,315

[52] U.S. Cl. .......................................... 172/130, 172/294
[51] Int. Cl. .......................................... A01b 17/00
[58] Field of Search ............. 172/126, 127, 128, 131, 132, 172/130, 129; 137/596.2

[56] References Cited

UNITED STATES PATENTS

| | | | |
|---|---|---|---|
| 3,587,750 | 6/1971 | Cantral et al. | 172/130 |
| 3,503,451 | 3/1970 | Eastman | 172/225 X |
| 3,575,242 | 4/1971 | Olsson | 172/225 X |
| 3,556,226 | 1/1971 | Brewer et al. | 172/130 |
| 2,611,306 | 9/1952 | Strehlow et al. | 172/294 |
| 2,967,575 | 1/1961 | Du Shane et al. | 172/294 |
| 3,556,226 | 1/1971 | Brewer et al. | 172/130 |
| 2,175,282 | 10/1939 | Cormany | 172/126 |
| 2,954,800 | 10/1960 | Searles et al. | 137/596.2 |
| 3,072,200 | 1/1963 | Yerkes | 172/126 |
| 3,146,833 | 9/1964 | Friemel et al. | 172/126 |
| 3,299,903 | 1/1967 | Stacey | 137/596.2 |
| 3,511,316 | 5/1970 | Oerman et al. | 172/126 |
| 3,520,373 | 7/1970 | Stinemetz | 172/130 |
| 3,524,508 | 8/1970 | West | 172/126 |

Primary Examiner—Robert E. Pulfrey
Assistant Examiner—R. T. Rader
Attorney—Dressler, Goldsmith, Clement & Gordon

[57] ABSTRACT

A row marking apparatus including first and second row markers individually pivoted at one end on a tool bar of a tractor. Each marker is pivoted between raised and lowered positions by a ram having its cylinder connected to the tool bar and its piston rod pivotally connected intermediate the ends of the associated row marker. The flow of fluid to and from the ram is automatically controlled by a flow control valve which provides first and second isolated flow paths between a main valve and the rams. The flow paths cooperate with the rams to alternatively (1) sequentially raise and lower respective markers or (2) raise and lower an individual lowered marker.

Each row marker is preferably formed in two sections which are pivotally interconnected at adjacent ends and which are moved between folded and end-to-end relation when the row marker is moved between the lowered and raised positions. This movement is accomplished by a cable having one end connected to the tool bar and an opposite end connected to the second section and an intermediate portion of the cable cooperating with a guide located adjacent the pivotal connection for the sections.

4 Claims, 9 Drawing Figures

Patented May 30, 1972
3,666,019
2 Sheets-Sheet 1
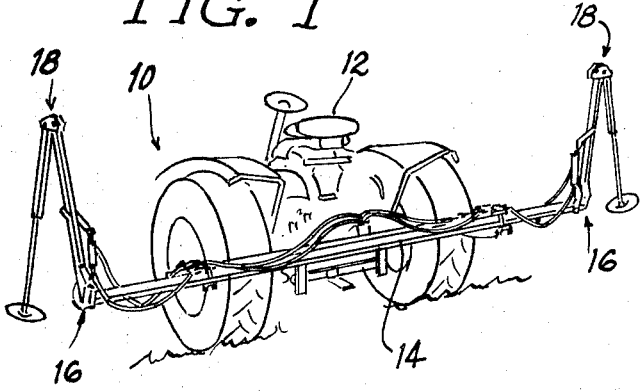
FIG. 1
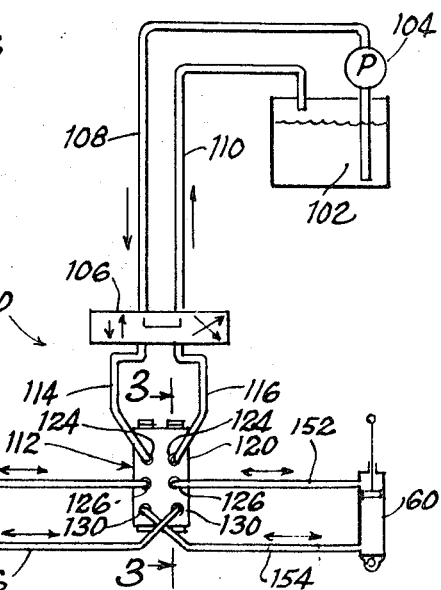
FIG. 2
FIG. 3
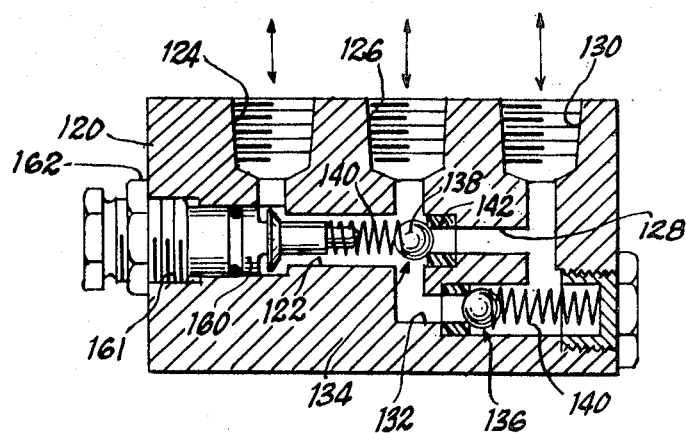
FIG. 4
INVENTOR
Laurel R. Yeske
by Dressler, Goldsmith,
Clement & Gordon
Attys

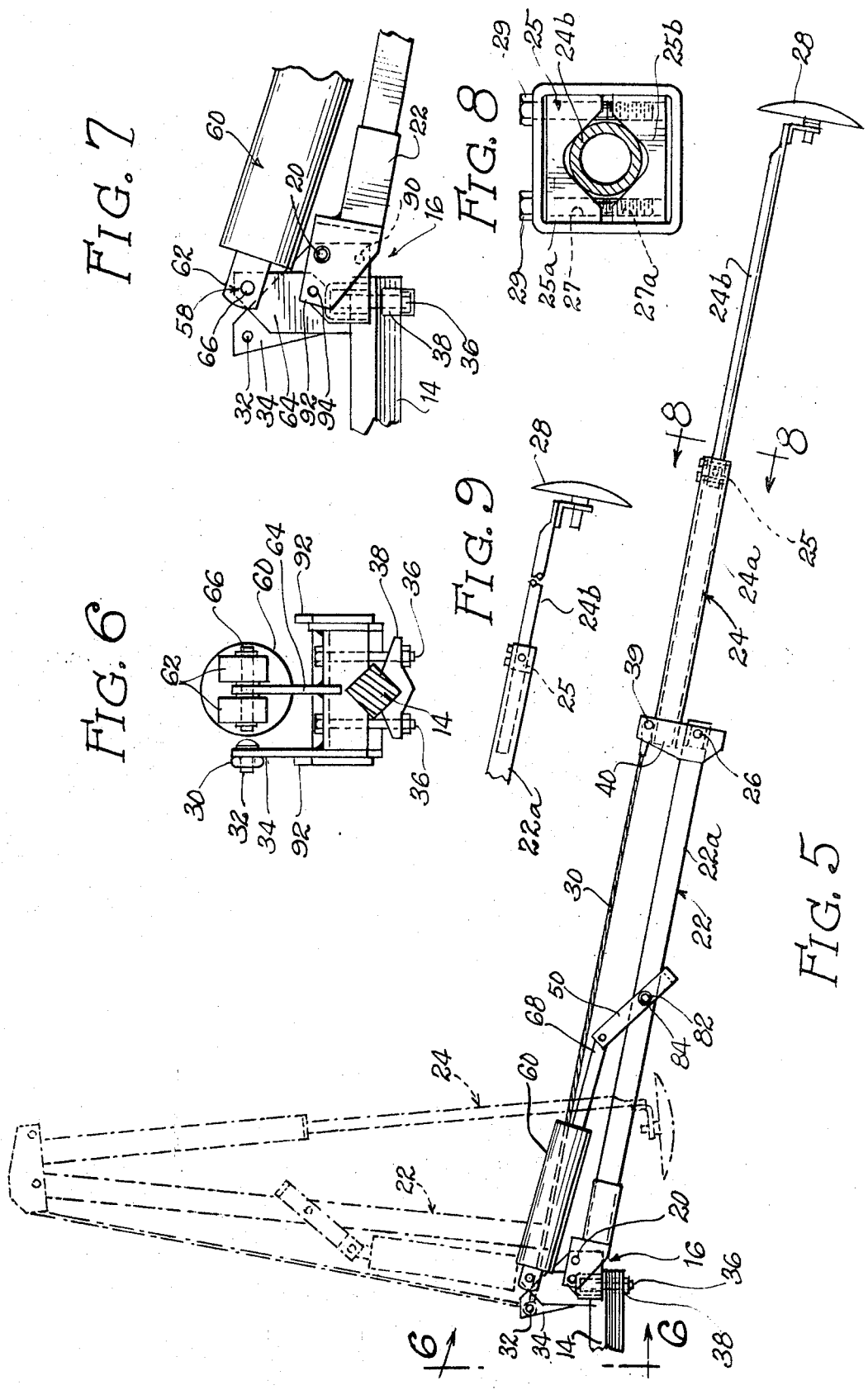

ROW MARKING APPARATUS

BACKGROUND OF THE INVENTION

The present invention relates generally to row marking apparatus for agricultural implements, and more particularly to an improved row marker and a marker control mechanism for a pair of row markers.

It has become standard practice in the planting of row crops to provide a mark for the vehicle so that adjacent rows, resulting from subsequent passes of the implement, will be properly spaced. For many years, the marking of the path was accomplished by a pair of row markers which were individually controlled through the use of cables having one end connected to the row marking apparatus and the other end located adjacent the operator of the implement. Generally, the raising and lowering of the individual row markers was manually controlled by the operator grasping the appropriate cable and raising the marker from its lowered position. In the raised position, the marker was generally latched by some suitable mechanism which again would be actuated by the operator at the operator's station.

With the recent increase in size of planting mechanism for row crops, the length of the row markers had to be necessarily increased to accommodate the increase in size of the implements. With such an increase in the size of the implement and the length of the row marking apparatus, it became essentially mandatory to form the row markers in sections which were folded to an adjacent relationship when the row marker was in the raised position. A row marker of this type is disclosed in U.S. Pat. No. 3,072,200.

Also, with the increased length in the row markers, it became increasingly more difficult to raise and lower the row markers by the use of manual power supplied to cables attached to the row markers. Thus, hydraulic power means in the form of a single fluid ram have been proposed with the single ram being connected through cables to each of the row markers. Such an arrangement is disclosed in U.S. Pat. Nos. 3,139,941 and 3,146,833.

While such an arrangement was successful in substitution of hydraulic power of the manually operated previously known devices, the simplified power type controls did not incorporate any mechanism which would allow individual control of the hydraulically operated markers. Thus, the hydraulic system could not be operated in a manner to lower one marker as the other marker was raised.

A more complicated type of mechanism of the single fluid ram type disclosed in the above mentioned U. S. Pat. No. 3,146,833, issued to Friemel et al., would allow individual raising and lowering of markers while the other of the markers was maintained in a raised position. However, such an arrangement required many complicated parts and has never found any considerable commercial success.

As an alternative to the Friemel et al., arrangement, it has recently been proposed to provide separate single acting fluid cylinders for each of the row markers. Such an arrangement is disclosed in Martin U.S. Pat. No. 3,158,204 and Day U.S. Pat. No. 3,250,333. While the single acting individual cylinders for each row marker have found considerable success, there are still several serious drawbacks in an arrangement of this type.

One of the problems in this type of arrangement is that the single acting cylinders necessarily require that the marker be moved from the raised to the lowered position by relying upon the weight of the marker to produce the pivoting action of the marker. Thus, in many instances, where the vehicle was operating at an incline, the row marker would have the center of mass disposed inwardly of the pivot axis for the marker and would not lower. Furthermore, such an arrangement required some type of mechanism for defining the lowered position for the marker.

An additional problem of the single acting dual cylinders was that the operator had to manipulate the control valve to first supply pressured fluid to one row marker to move it to the raised position and then subsequently manipulate the valve to allow the fluid from the opposite cylinder to be exhausted thereby allowing the other row marker to move to the lowered position. This manipulation of the control valve was required at the end of a field while the operator's attention was needed for many other operations, such as the raising and lowering of the implement and the turning of the vehicle.

An additional shortcoming of the single acting plural cylinder arrangement was that the mechanisms heretofore commercially available again required some type of latch mechanism which was operated from the vehicle seat and which defined the raised position for the respective row markers.

BRIEF SUMMARY OF THE INVENTION

The present invention contemplates a pair of row markers, each of which is controlled by a double acting cylinder incorporated into a linkage means between the tool bar and an intermediate portion of the row marker. The fluid control system for the respective fluid rams incorporates a main control valve forming part of the tractor fluid control system and an automatic flow control valve interposed between the main valve and the respective fluid cylinders.

The flow control valve provides first and second flow paths each of which is connected to one of the cylinders at one end thereof and the other of the cylinders at the opposite end thereof to allow for alternative (1) sequential retraction of one piston rod and subsequent extension of the other piston rod by movement of the control valve in one direction from a neutral position; and (2) retraction and extension of the extended piston rod by movement of the main valve in opposite directions from a neutral position. For this purpose, each flow path is divided into a main portion leading to the one end of the first cylinder and an auxiliary portion leading to the opposite end of the other cylinder with the auxiliary portion having check valve means therein which prevents flow until the pressure in the main flow path reaches a predetermined level. Each flow path also has a by-pass flow path accommodating the flow from the auxiliary flow path to the main flow path and which provides the flow path for the exhaust fluid from the cylinder receiving the pressured fluid.

The linkage means for raising and lowering each row marker incorporates first and second links pivotally interconnected at one end with one link defined by the fluid ram and the opposite link having its free end frictionally connected to an intermediate portion of the row marker. The frictional connection maintains a substantially fixed relation between the link and the row marker during normal raising and lowering of the row marker and accommodates limited relative movement between the link and the row marker to allow limited pivotal movement of the row marker in its lowered position, as when it encounters an obstruction. The frictional connection between the second link and the row marker further accommodates extension of the piston rod relative to the cylinder while the row marker is in its raised position so as to prevent destruction of any of the parts if the cylinder happens to be extended while the row marker is locked in a raised position.

According to another aspect of the invention, each row marker includes first and second pivotally interconnected sections with a cable attached at one end to a bracket forming the pivotal connection for the row marker to the tool bar and connected at its opposite end to the second section. The cable is guided over a cable guide located at the pivotal connection for the section and automatically moves the section from a folded adjacent position to substantially end-to-end relation when the row marker is moved from the raised to the lowered position.

BRIEF DESCRIPTION OF THE SEVERAL VIEWS OF THE DRAWINGS

FIG. 1 is a perspective view of a tractor having the row marking apparatus of the present invention attached to the tool bar thereof;

FIG. 2 is a schematic illustration of the fluid control system of the present invention;

FIG. 3 is a vertical sectional view taken generally along lines 3—3 of FIG. 2 and showing the internal structure of the flow control valve of the present invention;

FIG. 4 is an enlarged perspective view of one of the row markers of the present invention;

FIG. 5 is a side elevational view of the row marking apparatus shown in FIG. 4;

FIG. 6 is an end view of the bracket means as viewed along line 6—6 of the FIG. 5;

FIG. 7 is an enlarged fragmentary side elevational view of the bracket means shown in FIG. 6;

FIG. 8 is a sectional view taken generally along line 8—8 of FIG. 5; and

FIG. 9 is a fragmentary side elevational view of a slightly modified row marker.

DETAILED DESCRIPTION

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated.

FIG. 1 of the drawings discloses a fragmentary portion of a tractor 10 having an operator seat 12 and supporting a tool bar 14 adapted to be raised and lowered by conventional draft control means (not shown), generally forming an integral part of the tractor 10. The tool bar or implement frame is adapted to support a plurality of ground engaging implements for planting or tilling row crops. Adjacent opposite ends of the tool bar, are a pair of brackets 16 each supporting a row marking mechanism or apparatus 18 constructed in accordance with the present invention.

Each of the row markers 18 is pivoted at 20 about a first pivot axis on the bracket 16 and includes first and second sections 22 and 24 which have adjacent ends pivotally interconnected at 26. The section 24 includes first and second telescoping tubular portions 24a and 24b adjustably interconnected by a clamp 25 so as to regulate the effective length of the row marker in its operative or lowered position. The free end of the second telescoping tubular portion has a ground engaging disc 28 rotatably supported thereon which is adapted to engage the ground and produce a score line to indicate the path of movement of the vehicle for a subsequent traverse of the field.

The clamp 25 includes first and second clamp portions 25a and 25b, each of which has a V-shaped groove receiving a portion of the circular tubular member 24b. The clamp portions 25a and 25b are received within the rectangular tubular member 24b and the portion 25a has bores 27 while the portion 25b has threaded openings 27a. A pair of bolts 29 are received through the bores 27 and aligned openings in the tubular member 24b and are threaded into the openings 27a. Thus, the portions 24a and 24b may readily be adjusted relative to each other by loosening bolts 29 and sliding tube 24b relative to member or tube 24a.

According to one aspect of the present invention, the two row marker sections 22 and 24 are adapted to be moved from a folded or adjacent relationship to a substantially end-to-end relationship automatically as the row marking mechanism is moved from the inoperative or raised to the operative or lowered position. This is accomplished by a simple and inexpensive mechanism which includes a minimum number of parts that are readily assembled. Thus, the mechanism for moving the two sections from the folded to the extended position includes a cable 30 having one end connected at 32 to a plate 34 forming part of the bracket means 16. The plate and bracket means are fixedly secured to the end of the tool bar by a pair of bolts 36 and a clamp 38.

The free end of the cable 30 is fixedly secured to one of a pair of plates 40 which form part of the pivotal connection between the two sections 22 and 24. The plate 40 which has the cable attached thereto at 39 also defines cable guide means which define an arcuate guide over which an intermediate portion of the cable 30 is trained when the row marker 18 is moved from the operative lowered position to the inoperative raised position.

Thus, as the row marking apparatus 18 is moved from its lowered position shown in solid line in FIG. 5 to the raised position shown in the dotted line of FIG. 5, the two row marking sections 22 and 24 will automatically be moved from the end-to-end relation to the adjacent or folded relation shown in the dotted line. This results from the cooperation between the cable guide means 42 and the cable 30 as the row marker, and more particularly the section 22 is pivoted from the lowered position to the raised position. Since the center of mass of the second section 24 is substantially beyond the pivot axis 26 interconnecting the two sections, the weight of the second section will at all times maintain the cable 30 taut as the first section 22 is pivoted about its pivot axis at 20. The pivotal movement of the second section 24 about the pivot axis 26 will rotate the point of connection of the free end of cable 30 to plate 40 about the axis 26. Since the opposite end of the cable is fixedly secured at 32 to the bracket means 16, the movement of the pivot 26 to the raised position will reduce the effective distance between the pivot 26 and the connection 32 thereby allowing the two sections 22 and 24 to move to substantially adjacent or folded relation.

According to another aspect of the present invention, the row marking apparatus includes powered linkage means for moving the row marker, particularly the section 22, between raised and lowered positions. The linkage means is in the form of first and second links 50 and 52 pivotally interconnected at 54 and respectively pivoted at 56 on an intermediate portion of the row marking section 22 and at 58 on the bracket means 16. The second link 52 is in the form of a fluid ram (FIGS. 5 to 7) having the head end of the cylinder connected through lugs 62 to a plate 64 extending from the main portion of the bracket 16 and connected thereto by a pin 66 to define the pivot axis 58. The cylinder 60 slidably receives a piston rod 68 having its free end pivotally connected to the link 50 through a clevis 70 (FIG. 4) and a pin 72 to define the pivot axis 54.

According to a further aspect of the present invention, the link 50 cooperates with the marker section 22 and includes means for limiting the pivotal movement about its axis 56 between extreme positions and includes friction means which normally maintain the link in one extreme position relative to the marker section but which accommodates relative movement between the link and the marker section 22 to an opposite extreme position. This mechanism includes a C-shaped portion 80 which is integral with and extends from one end of the lever 50. The C-shaped portion 80 cooperates with the main portion of the link 50 to define a U-shaped end portion for the link 50. This U-shaped portion is pivotally connected at 56 to the marker section 22 through a bolt 82 and adjustable lock nut 84 to produce friction between the adjacent surfaces of the U-shaped portion and the marker section 22. Thus, appropriate tightening or loosening of the lock nut 84 relative to the bolt 82 will adjust the amount of frictional force required to cause pivotal movement of the link 50 relative to the row marker section 22. The frictional connection between the lever or link 50 not only accommodates relative movement of the link and the row marker 18 when the row marker is in an operative position and encounters an obstruction but also is capable of sufficient relative movement when the row marker is in the raised position to allow complete extension of the piston rod 68 relative to the cylinder 60. Both of these features are desirable in a commercially acceptable row marker which utilizes a double acting hydraulic cylinder since the hydraulic cylinder will be locked in its extended or retracted position so that it is necessary to provide limited relative movement between the free end of the piston rod and the row marker when the marker is in the operative position. The present arrangement not only accomplishes the latter but also automatically prevents destruction of any of the parts if the row marker happens to be in a locked, raised position, to be described later, and the fluid cylinder is actuated. Furthermore, the friction will produce sufficient forces to maintain a fixed relation between the link 50 and section 22 so that the row marker may be lowered even when the center of mass of the row marking apparatus is located inwardly of the pivot 20.

According to another aspect of the invention, the row marker is designed so that the section 24 may readily be completely removed and the section 22 may be converted into an adjustable member to change the effective length thereof. For this purpose, the section 22 consists of a tubular portion 22a (FIG. 9) which is substantially identical in cross-sectional configuration to the tubular portion 24a and is capable of receiving the clamp means 25 as well as the tubular portion 24b. Use of the row marker in this configuration thus produces first and second tubular portions, one of which is pivotally connected at 20 to the bracket means 16 and the other of which is telescoped in the first tubular portion.

The row marking mechanism further includes means for locking the row marker in the raised position as is many times necessary when the tractor and implement are transported between operating areas. Such a locking means is provided in a simple and efficient manner by having an opening 90 extending through a portion of the bracket means 16 and located substantially directly below the pivot axis 20. The adjacent end of the row marker section 22 has a pair of plates 92 extending on opposite sides of the main bracket and pivotally connected to the main bracket at the pivot axis 20 with openings 94 defined in the respective plates 92.

In the raised position, the openings 94 are aligned with the openings 90 in the bracket 16 so that a pin (not shown) may be inserted and securely lock the row marking mechanism in the raised position.

According to a further aspect of the present invention, the row marking apparatus of the present invention incorporates flow control means in the fluid control system which supplies pressured fluid to opposite ends of the fluid cylinders 60. The flow control means is capable of automatically retracting an extended piston rod and subsequently extending a retracted piston rod so as to raise one row marker and subsequently lower another row marker while allowing the main control valve, forming part of the tractor hydraulic control system, to remain in one operative position. The flow control means further is capable of accommodating flow of pressured fluid to extend and retract one piston rod thereby raising and lowering one row marker by movement of the main control valve in opposite directions from a neutral position, while maintaining the other row marker in the raised position.

The flow control valve for accomplishing the above is incorporated in a fluid control system 100 including a reservoir 102 and a pump 104 which is capable of supplying pressured fluid to a main control valve 106 through a conduit 108. The main control valve 106 is also connected to the reservoir 102 through a further conduit 110. The main flow control valve 106 is also connected to the flow control means 112 through first and second conduits 114 and 116.

The flow control means or valve 112 defines first and second isolated flow paths from the valve to each of the cylinders. Since the two flow paths are identical in construction within the housing 120 of the flow control means 112, only one such flow path will be described. The construction of the valve 112 for producing the flow path is illustrated in FIG. 3 and includes a bore 122 extending from one edge of the housing 120 and having first and second ports 124 and 126 communicating therewith. An additional bore 128 connects the inner end of bore 122 with a third port 130. The bore 122 further communicates with the third port 130 through a further bore 132 which is isolated from the bore 128.

First and second check valve means 134 and 136 are incorporated in the respective bores 128 and 132 between the port 130 and the bore 122. In each instance, the check valve means are in the form of a ball 138 spring biased by a spring 140 into engagement with a sleeve 142.

Thus, each flow path within the valve housing 120 includes a main portion between the first port 124 and the second port 126 defined by the bore 122 and an auxiliary portion communicating at one end with the bore 122 or the main portion of the flow path and communicating at its opposite end with the port 130. The auxiliary portion has the check valve means 136 incorporated therein. The check valve means 136 is normally maintained in a closed condition by the spring 140 until the pressure of the fluid in the main flow portion of the flow path reaches a predetermined level, for a purpose which will become apparent hereinafter.

Each flow path further has a by-pass flow path between the port 130 and the main flow path defined by bore 128 with the check valve means 134 incorporated therein. Thus, the two check valve means 134 and 136 provide unidirectional flow in opposite directions between the second and third ports, for a purpose which will be described hereinafter.

As more clearly shown in FIG. 2, the ports 126, forming part of each of the flow paths, are respectively connected through conduits 150 and 152 to the rod ends of the respective cylinders 60. Also, the third ports 130 are respectively connected through conduits 154 and 156 to the head ends of the respective cylinders 60. However, the flow paths in this instance are cross-connected so that the rod end of one cylinder is connected to one flow path while the head end of the opposite cylinder is connected to the same flow path.

Each flow path further includes adjustable restrictor means for limiting or controlling the flow of fluid through the first port 124. The adjustable restrictor means is in the form of a restrictor 160 threadedly received in the threaded open end 161 of the bore 122 and cooperating with the bore downstream of the first port 124 in the main portion of the flow path. The adjustable restrictor 160 is maintained in an adjusted position by a lock nut 162.

OPERATION OF CONTROL SYSTEM

Assuming that the right-hand row marker 18 is in its lowered position and the left-hand row marker is in the raised position, actuation of the valve spool in main control valve 106 to the left as viewed in FIG. 2 will place the right-hand first port 124 in communication with the pressured fluid source developed by the pump 104 and the left-hand first port 124 in communication with the reservoir. Since the right-hand piston rod is in the extended position and the right-hand row marker is in the lowered position, pressured fluid will flow between the first and second ports 124 and 126 of the right-hand or first flow path and will cause a retraction of the piston rod 68 and a raising of the right-hand row marker. While pressured fluid is being supplied to the rod end of the right-hand cylinder, its head end will be in communication with the reservoir through the by-pass and main portion of the left-hand flow path.

While the right-hand piston rod is in other than the retracted position, the pressure of fluid in the main flow path defined by bore 122 between the ports 124 and 126 will be below the level required to open check valve 136 in the auxiliary flow path defined by the bore 132 to the third port 130. Thus, the right-hand piston rod will be fully retracted before the pressure of fluid in the main portion of the right-hand flow path is sufficient to open check valve 136 and allow any supply of pressured fluid to the head end of the left-hand cylinder 60. This will cause a sequential raising of a lowered marker and a subsequent lowering of a raised marker.

All of this is accomplished by having the main control valve 106 in one of its operative positions so that the operator may merely move the control valve to one operative position when he reaches the end of a field and devote all of his attentions to making the appropriate turn and raising and lowering the agricultural implement.

However, if it is desired to merely partially raise and lower the lowered row marker, as when it is necessary to pass over an obstruction, the operator can again perform such operation by mere manipulation of the main control valve 106. The right-hand row marker may be partially or fully raised by moving the control valve to the left as viewed in FIG. 2 and when the control valve is moved to its neutral position, the fluid downstream of the valve 106 will be trapped and will maintain the row marker in the partially or fully raised position. When it is desired to again lower the right-hand row marker, the valve spool of main control valve 106 is moved to the right as viewed in FIG. 2 so as to supply pressured fluid to conduit 114 while connecting conduit 116 to the reservoir 102. In this condition, the flow of pressured fluid will be received in the left-hand flow path and more particularly in the main portion of the left-hand flow path defined by the bore 122. However, with the fluid ram piston rod 68 of the left-hand row marking apparatus in its fully retracted position, the pressure of fluid will rapidly build up in the main portion of the left-hand flow path and will open the check valve 136 in the auxiliary portion of the main flow path so as to supply pressured fluid to the head end of the right-hand cylinder 60. This supply of pressured fluid will lower the right-hand row marker 18. During such lowering, it is, of course, appreciated that the fluid within the rod end of the right-hand cylinder 60 must be returned to the reservoir and this is accomplished by having the fluid pass through the main portion of the right-hand flow path.

Thus, it will be appreciated that the present invention provides a simple and effective manner for automatically raising a lowered row marker and subsequently lowering a raised row marker by movement of the control valve to one position. Alternatively, either of the lowered row markers may be raised and lowered independently at any time to provide the necessary control during the operation of the row marking apparatus.

Also, the means for lowering each of the row markers is capable of producing a positive force in lowering the marker which is necessary when the center of mass of the row marker 18 is disposed inwardly of the pivot axis defined by the bolt 20. The drive means for raising and lowering each row marker is a simple arrangement which is capable of maintaining the row marker in any position. Furthermore, the frictional connection between the link 50 and the row marker 18 allows for relative movement between the link and the marker when the marker disc 28 engages an obstruction or alternatively when the marker is locked in the raised position and pressured fluid is inadvertently supplied to the head end of the cylinder 60.

The simple and inexpensive arrangement of pivoting each individual row marker and the manner of adjusting the effective length allows for adaptation of each row marker to a plurality of different operations.

What is claimed is:

1. A row marking apparatus adapted to be used with a tractor of the type having a tool bar and a hydraulic system including a reservoir, a pressured fluid source and conduits connecting a valve to said source and said reservoir, comprising a pair of bracket means adapted to be attached adjacent opposite ends of the tool bar; a pair of row markers respectively pivotally connected at one end to said bracket means; and means for moving said row markers between raised and lowered positions comprising a pair of fluid rams each including a cylinder and a piston rod extensible and retractable in said cylinder, said cylinders respectively being pivoted on respective bracket means; lever means connecting the free ends of said piston rods respectively to intermediate portions of said row markers, said lever means accommodating limited movement of said row markers relative to said piston rods; conduit means connecting said valve to opposite ends of said cylinders whereby actuation of said valve in opposite directions from a neutral position will raise and lower said row markers; and flow control means in said conduit means for (1) sequentially raising a lowered row marker and lowering a raised row marker when one of said row markers is in the lowered position and said valve is moved in one direction from a neutral position and (2) alternatively raising and lowering said row marker in the lowered position when said valve is moved in opposite directions from a neutral position, said flow control means defining first and second flow paths from said valve to said cylinders, each flow path having a main portion connected to one end of one of said cylinders and an auxiliary portion connected to an opposite end of the other of said cylinders; and check valve means in each of said auxiliary portions of said flow paths and accommodating flow of fluid from the main portions connected to one end of one of said cylinders through the auxiliary portions to the opposite end of the other of said cylinders when the pressure of fluid in said main portions reaches a predetermined level.

2. In a row marking apparatus having a pair of row markers respectively pivoted at one end on brackets; and fluid rams having cylinders and piston rods extensible to lower said markers and retractable to raise said row markers, a fluid control system comprising a fluid source under pressure; a reservoir, a control valve and conduit means connecting said control valve to opposite ends of said cylinders and to said source and reservoir, the improvement of flow control means in said conduit means for alternatively (1) sequentially retracting one piston rod in its associated cylinder and extending the other piston rod in its cylinder by movement of the control valve in one direction from a neutral position to sequentially raise one row marker and lower the other row marker, (2) retracting and extending said one piston rod to raise and lower said one row marker when said valve is moved in opposite directions from a neutral position, said flow control means defining first and second flow paths, each of said flow paths having a main portion connected to one end of one of said cylinders and an auxiliary portion connected to the opposite end of the other of said cylinders, said auxiliary portion having check valve means preventing flow of fluid in said auxiliary portion of said flow path when the piston in said one of said cylinders is in other than the fully retracted position and accommodating flow of fluid to said other of said cylinders to extend the piston rod when the piston rod of said one of said cylinders is in the fully retracted position.

3. A row marking apparatus as defined in claim 1, including the further improvement of said first and second flow paths each having a by-pass flow path accommodating unidirectional flow of fluid from said auxiliary portion to said main portion of each flow path.

4. The combination as defined in claim 2, in which said first and second flow paths each include a by-pass portion accommodating unidirectional flow from the auxiliary portion to said main portion; said by-pass portions accommodating flow of fluid from the opposite ends of said cylinders through said control valve to said reservoir.

* * * * *